March 20, 1928. 1,663,115
C. B. COMSTOCK
BAKER'S OVEN
Filed Sept. 5, 1923 5 Sheets-Sheet 3
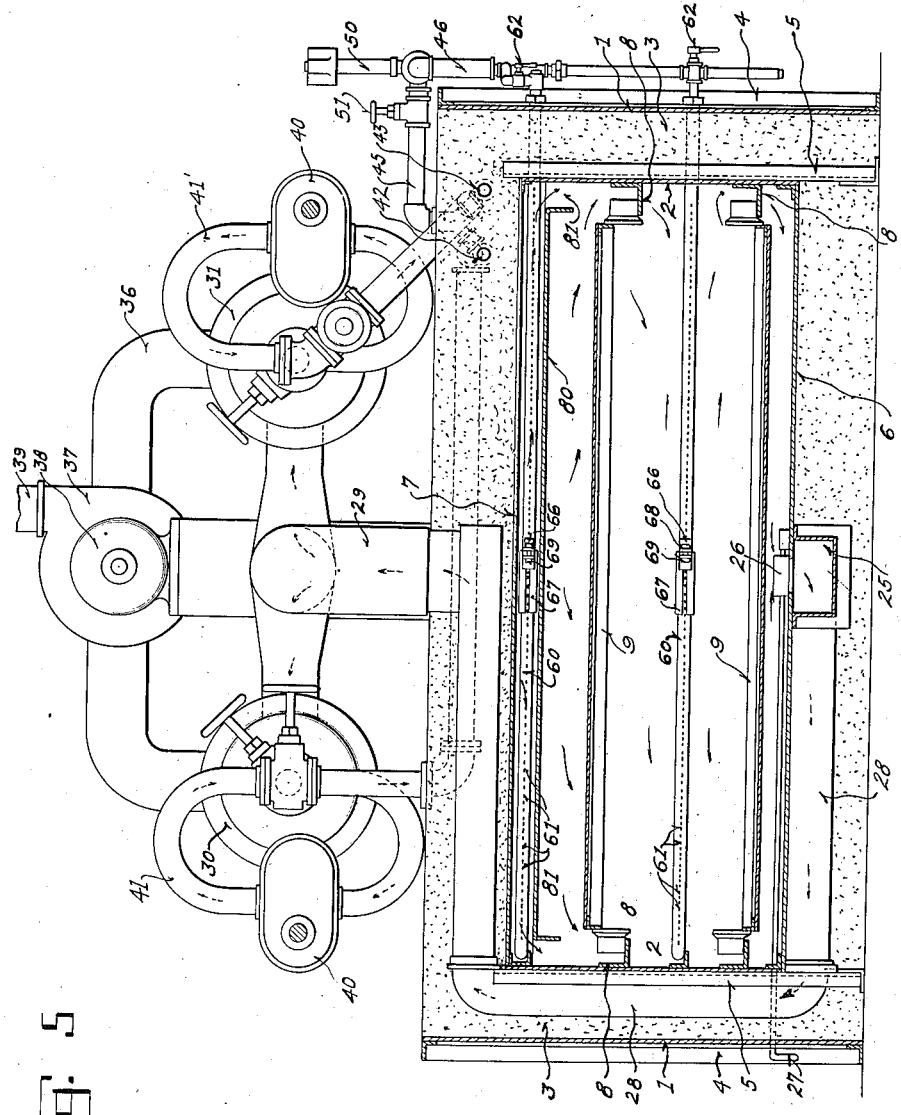
Inventor
Corry B. Comstock.
By Cushman Bryant & Darby
Attorneys March 20, 1928.
C. B. COMSTOCK
1,663,115
BAKER'S OVEN
Filed Sept. 5, 1923
5 Sheets-Sheet 4
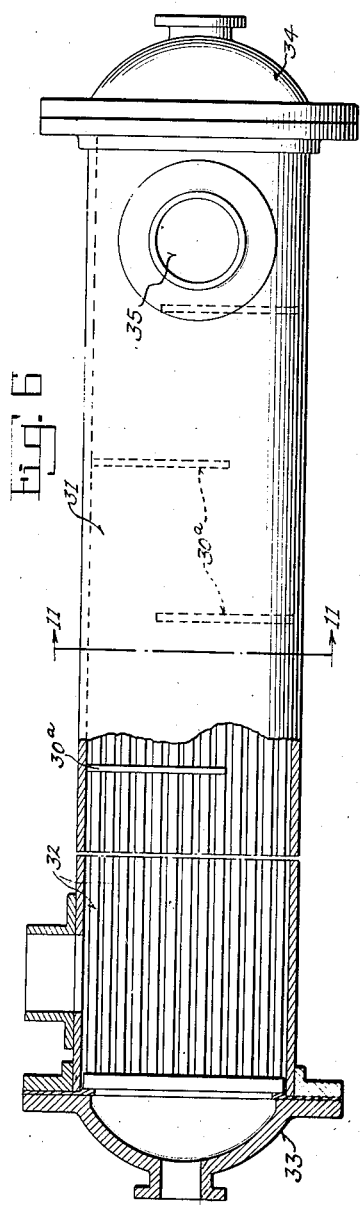
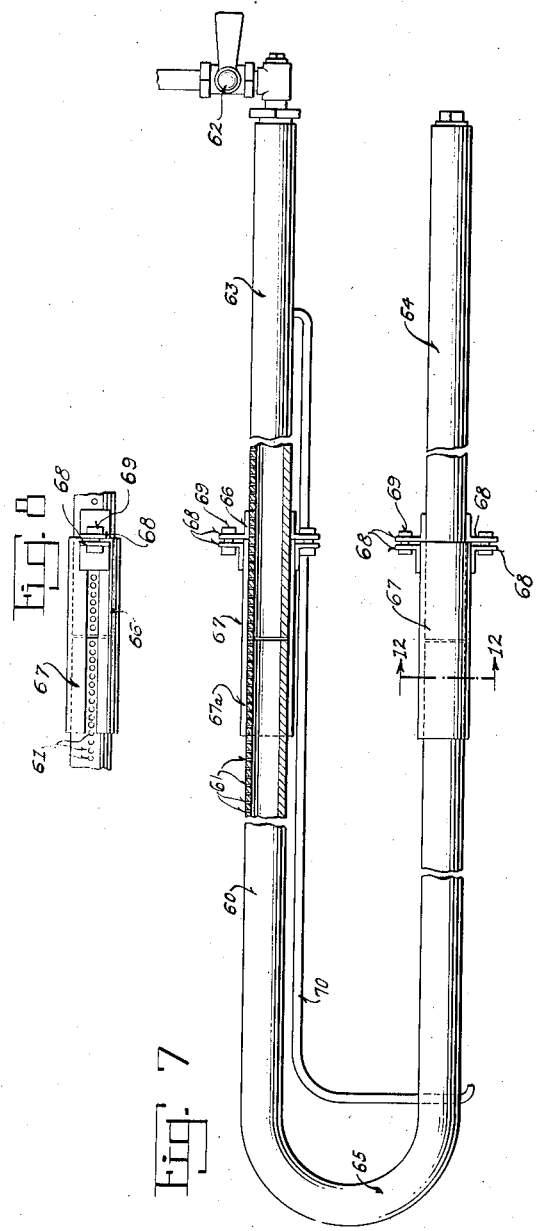
Inventor
Corry B. Comstock
By Cushman Byant & Darby
Attorney March 20, 1928.
C. B. COMSTOCK
1,663,115
BAKER'S OVEN
Filed Sept. 5, 1923
5 Sheets-Sheet 5
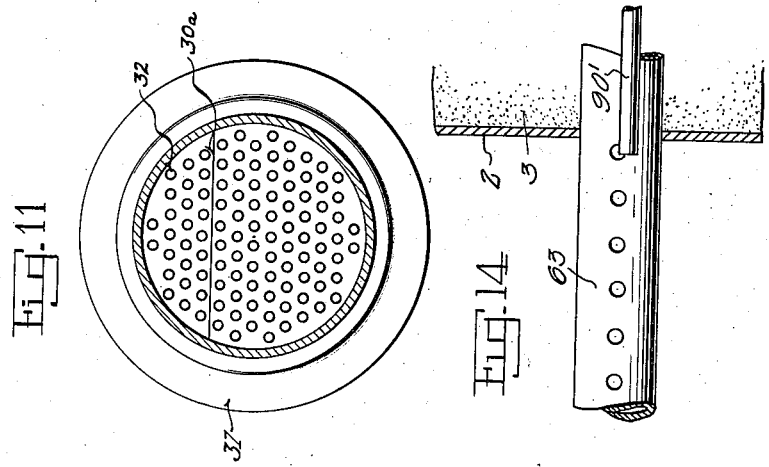
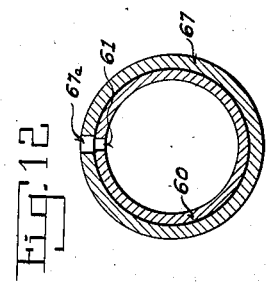
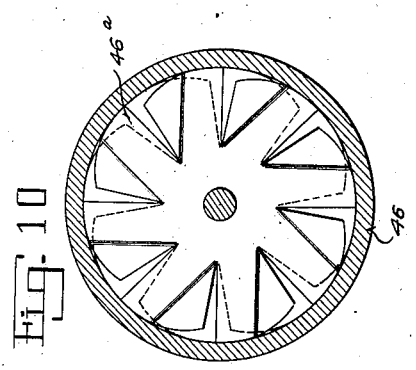
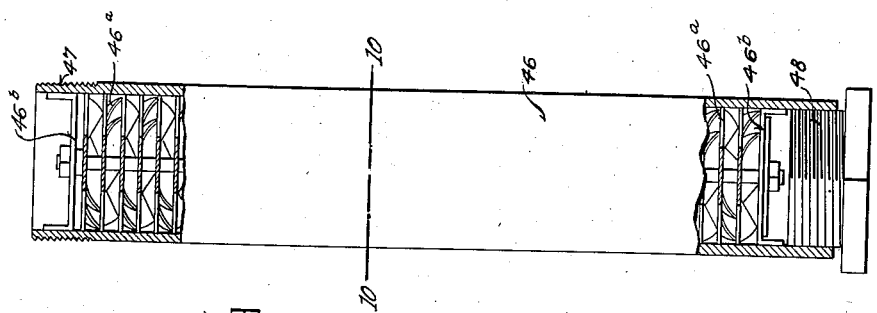
Inventor
Corry B. Comstock
By Cushman Bryant & Darby
Attorneys Patented Mar. 20, 1928.

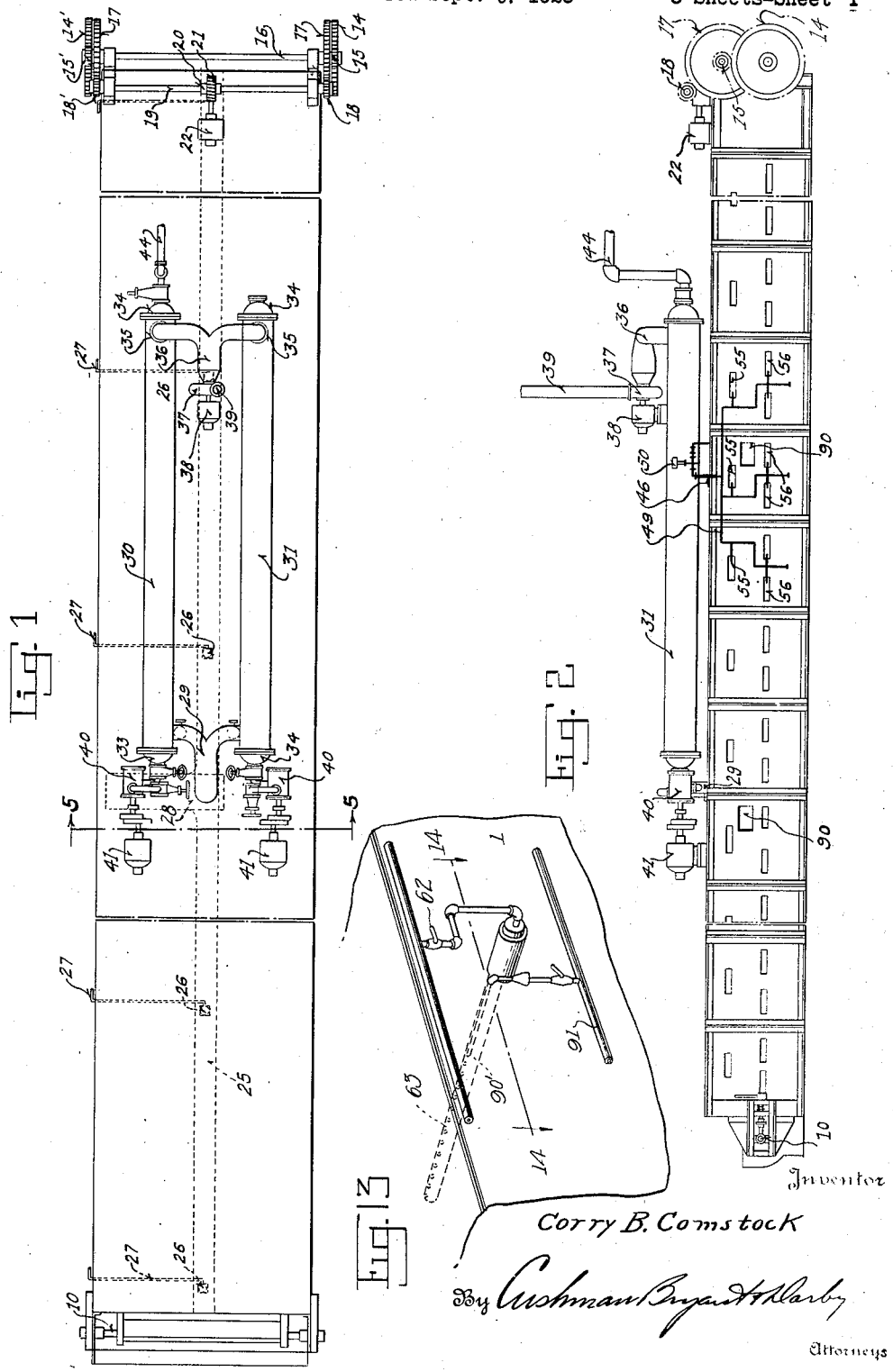

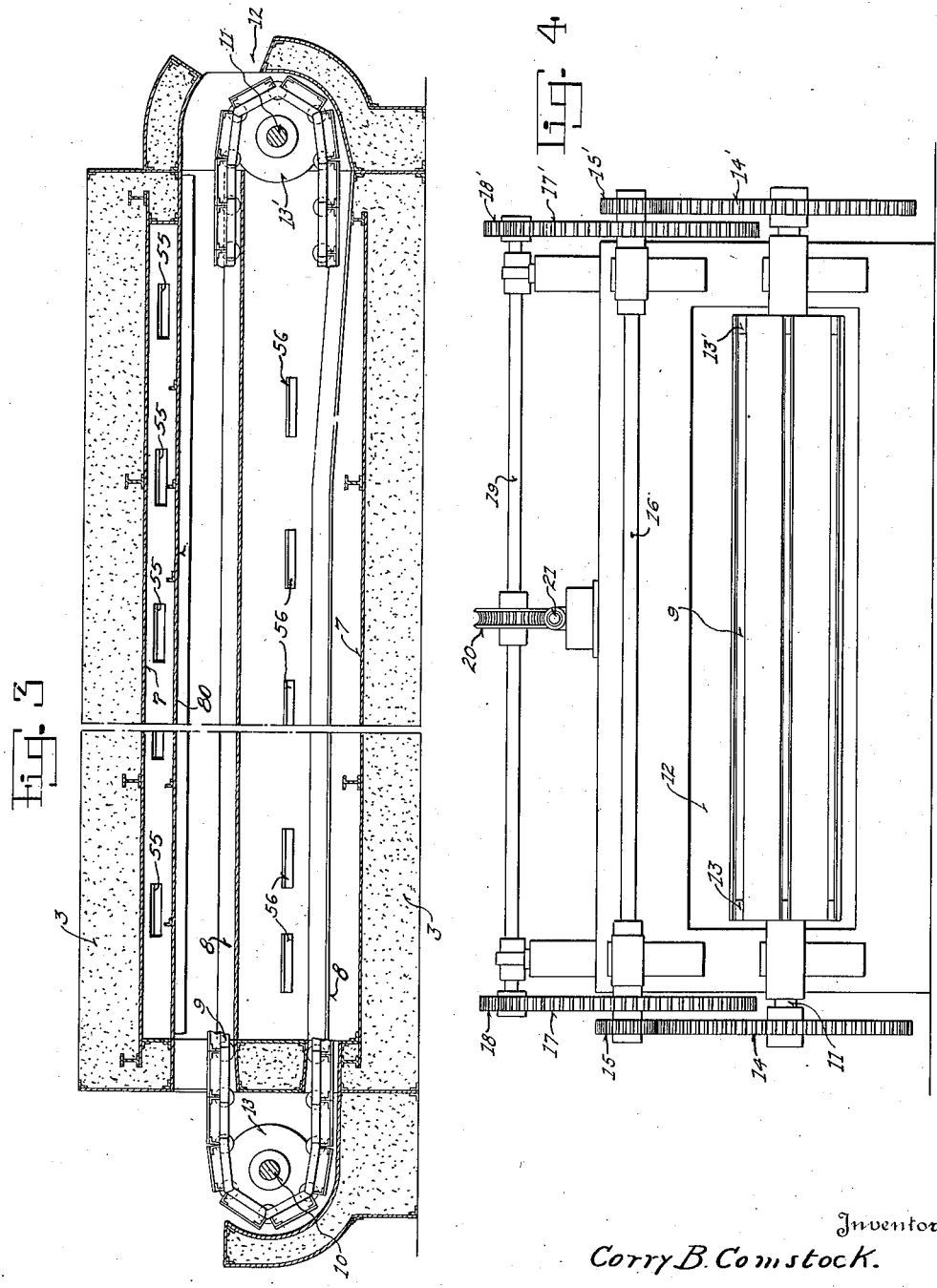

1,663,115

UNITED STATES PATENT OFFICE.

CORRY B. COMSTOCK, OF NEW YORK, N. Y., ASSIGNOR TO COMSTOCK OVEN COMPANY, INC., OF NEW YORK, N. Y., A CORPORATION OF NEW YORK.

BAKER'S OVEN.

Application filed September 5, 1923. Serial No. 661,064.

The present invention relates to improvements in ovens, and will be shown in connection with bakers' ovens. The object of the invention is to provide a novel construction and arrangement of parts constituting such an oven, and an improved method of operating the same, whereby the efficiency of the oven will be materially increased and an improved product obtained.

The invention is particularly adapted for use with ovens of the type employing an endless conveyor for transporting the products, for example, bread, through the oven, and one of the objects of the invention is to provide an oven of this type which will be composed of a series of similar sections which may be readily assembled to that an oven of any desired length may be initially built or the length of the oven increased or decreased, if desired.

In the use of ovens of the type referred to, particularly in baking, the vapor rising from the products during the baking operation, and any vapor caused by the introduction of steam or moisture to the baking chamber, collects in the upper part of the baking chamber, and as this vapor collects, the pressure thereof tends to carry it toward the open ends of the oven through which the endless carrier enters and leaves the baking chamber. It is customary to provide fans adjacent the open ends of the baking chamber by which such vapor may be withdrawn.

The vapor accumulating in the upper portion of the oven necessarily exerts pressure on the products being baked, and, to some degree, retards the expansive action or rising of the loaf under the action of the baking heat.

One of the particular objects of the invention is to provide means whereby the products being baked will be relieved from excessive pressure of such vapor, so that the loaf may freely expand to the maximum degree and a lighter product be obtained than is possible with the methods and by the means heretofore employed.

A further object of the invention is to utilize the heated vapor withdrawn from the baking chamber as a means for preheating the gaseous fuel which is supplied to the oven burners.

The invention will be hereinafter described in detail in connection with the accompanying drawings, in which one embodiment of the invention is shown, although these drawings are merely illustrative and in no sense restrictive of the invention.

In the drawings:—

Fig. 1 is a plan of an oven embodying the present invention.

Fig. 2 is a side elevation.

Fig. 3 is a longitudinal vertical section, on an enlarged scale, of portions of the oven.

Fig. 4 is an elevation of the delivery end of the oven.

Fig. 5 is a sectional view, substantially on the line 5—5 of Figure 1, on an enlarged scale.

Fig. 6 is an enlarged view, partly in section, of one of the heat exchangers.

Fig. 7 is an elevation of one of the burners detached, partly in horizontal section.

Fig. 8 is an elevational detail of a part of the burner.

Fig. 9 is an elevation, partly in section, of one of the fuel mixers.

Fig. 10 is a section on the line 10—10 of Fig. 9.

Fig. 11 is a section on the line 11—11 of Fig. 6.

Fig. 12 is a section, on an enlarged scale, substantially on the line 12—12 of Figure 7.

Fig. 13 is a detail perspective view of a short pilot light and means for supplying gas thereto.

Fig. 14 is a sectional view showing a portion of the burner and the short pilot light.

Referring to the drawings, the improved oven is formed of a series of sections, each including outer and inner side walls 1, 2, and an intermediate body 3 of suitable heat insulating material. The walls 1, 2, are preferably formed of sheet metal plates suitably strengthened by angle iron uprights 4, 5, which may serve as means for connecting adjoining sections so that a baking chamber of any desired length may be readily provided. The sections or units may be of any desired length, suitably aligned and secured to give a continuous oven of the desired proportions.

The baking chamber has a metal bottom 6 and top 7 supported by suitable angle bars and the heat from the inner side plates 2, and insulating body 3 extends over the top plate 7 and beneath the bottom plate 6 so that the entire chamber is surrounded by such material.

The endless conveyor by which the articles to be baked are carried through the baking chamber is supported by rollers or wheels traveling on track members 8 within the oven chamber.

It will be understood that any suitable form of conveyor may be employed, and the illustration of this, as well as a number of other features of the invention in the accompanying drawings, is more or less conventional, the invention not being restricted to any particular form of conveyor, for example.

The conveyor 9 extends throughout the length of the baking chamber, and may project, and is here so shown, from the ends of said chamber. At its receiving end the conveyor is supported on sprockets 13 carried by a shaft 10 extending transversely across the end of the oven, and, as shown in Figure 3, the oven casing and the body of heat insulating material is extended beneath and about the sides and in front of the conveyor supporting sprockets, so that, when constructed with the ends of the conveyor projecting, these parts are encased, except for a relatively small space which is provided to receive the products to be transported into the baking chamber. As shown, the casing and insulating body extend a considerable distance above the axis of the shaft 10 and practically to the horizontal plane of the upper run of the conveyor.

The supporting shaft 11 and sprockets for the delivery end of the conveyor, beyond the end of the baking chamber, are similarly protected, a suitable opening 12 being provided through which the baked products may be removed from the conveyor by an attendant. The sprockets 13', which supports the delivery end of the conveyor, are carried by independent shafts separately mounted in suitable bearings on the frame structure of the oven, and on each of said shafts is secured a gear 14, 14'. With said gears mesh pinions 15, 15', on a shaft 16 that extends transversely across the delivery end of the oven, and on which are secured two gears 17, 17'. The gears 17, 17', are driven by pinions 18, 18', on a shaft 19, which is also provided with a worm wheel 20 that is driven by a worm shaft 21 actuated by a suitable motor 22 that is shown as supported on the top of the oven. By providing a separate train of gearing for driving each sprocket 13, 13', the space required for the gear trains is reduced to a minimum, and the conveyor 9 is positively and uniformly driven. It will be seen that the several pinions and gears are arranged in close, lateral, proximity, and project but a limited distance laterally from the oven, so that there is no undue waste of floor space in installing an oven constructed in accordance with the invention.

A conduit 25 (see Figs. 1 and 5) is provided beneath the bottom of the oven chamber, which conduit extends throughout the length of the chamber and is provided, at suitable intervals in its top wall, with inlet apertures adapted to be controlled by dampers 26, the handles 27 of which extend through a side wall of the oven. About midway the length of the oven the conduit communicates with the lower member of a flue or conduit 28, which, as here shown, extends upward along one side of the oven, between the walls 1, 2, thereof, and inward over the top plate 7, and communicates with a conduit 29 having two branches, which communicate, respectively, with the casings of two heat exchangers 30, 31, by which fuel (preferably gaseous) employed for heating the oven is preliminarily heated.

The two heat exchangers are of similar construction, each comprising a casing having therein a series of longitudinally extending tubes 32, supported by suitable headers, and communicating, at their ends, with chambers formed in the heads 33, 34. Each of said casings is provided with an outlet 35, with which connects one member of a suction pipe 36, that, in turn, communicates with the casing of a suction fan 37, driven by a suitable motor 38. A stack 39, connected to the fan casing, is provided for carrying away the heated air and vapor withdrawn by the fan from the baking chamber through the conduits 25, 28, 29, and the spaces within the casings 30, 31, about the series of tubes therein.

At one end each casing 30, 31, is connected with a suitable pressure pump 40, actuated by a motor 41, and the said pumps are, respectively, connected by pipes 41' with two mains 42, 43, which may, as here shown, extend longitudinally along one side of the oven, being embedded in the body of heat insulating material 3. A gas supply pipe 44 is connected to the inlet end of the casing 30, while the casing 31 is provided, at its corresponding end, with an air inlet.

By the action of the pumps 40, gas and air, under pressure, are supplied to the mains 42, 43, respectively, and, at suitable intervals, the mains are connected through branches 45 with mixers 46.

Various forms of mixers may be provided, but the one illustrated comprises a casing having, at one end, an external thread 47 to receive a coupling connecting it with the branch supply pipe 45, and having screwed into its opposite end a coupling 48, which connects with pipes 49 leading to the several burners. Within the casing 46 of the mixer are arranged a series of mixing plates 46ᵃ connected together by a bolt or rod extending longitudinally of the casing and secured at its ends to braces 46ᵇ extending across the interior of the casing. The said plates are slightly concave in cross section, and have their peripheries slitted to provide a series of separated blades which are slightly bent or bowed, so that portions thereof project beyond the plane of the body of the plate.

The several plates are so related that the currents of air and gas passing through the casing 46 are thoroughly intermingled.

Preferably the burners (see Figs. 2 and 5) are divided into several groups, each group being connected with one of the mixing chambers. To avoid confusion in the drawings, only a single group of burners is shown, but it will be understood that as many similar groups as may be necessary are provided, and each may be connected with an individual or independent mixer 46. Associated with each mixer or group of burners is a thermostatically controlled valve 50, conventionally illustrated, by which the supply of combustible fuel to each group of burners may be accurately controlled by the temperature of that portion of the baking chamber in which the particular group of burners is located. Each branch supply pipe 45 is also provided with a manually adjustable valve 51, by means of which the supply of fuel to an entire group of burners can be cut off when desired.

The burners extend through suitable apertures 55, 56, in the side wall plates 1, 2, said apertures being arranged in two vertically separated series, the upper series being in a plane above the upper run of the conveyor 9, and the lower series of apertures 56, being in a plane between the two runs of the conveyor.

The burners 60 extend substantially across the baking chamber (see Fig. 5), and each is of U form, the one leg of the burner being connected to the combustible fuel supply pipe, and the other end being closed, preferably, as shown, by a removable plug. The two parallel sections of the burner are in substantially the same horizontal plane, and each is provided with a series of perforations 61, at which the combustible fuel is ignited. Preferably these apertures or burner openings 61 are only provided in the portions of the tubes which face toward the ends of the baking chamber. The supply of combustible fuel to each burner is independently controlled by a valve 62.

To facilitate removal of the burners from the baking chamber, each, preferably, consists of three sections, namely, end sections 63, 64, and an intermediate, bowed section 65. The several sections are connected in any suitable manner, as by sleeve members 66, 67, which are provided with lugs 68 connected by suitable bolts 69. A slot 67ª is formed in the sleeve 67 in alignment with the burner openings 61. By this construction, it is possible, when the burner is disconnected from the supply main, to move it laterally through the openings 55, 56, until the bolts 69 are accessible, when the sections of the burner can be readily disconnected, and separately withdrawn. This substantially U-shaped burner is advantageous for the reason that it will give a uniform temperature throughout the width of the baking chamber. The average of the two temperatures of the flame adjacent the U or return bend will be the same as the average temperatures at the inlet end and the blank end of the burner, and this is a distinct advantage over a straight burner, in which there is variation in temperature from the inlet end to the blank end.

To ensure ignition of the gas issuing from the openings 61 in the burner member, which are remote from the supply pipe a small tube 70 is provided. Such tube leads from the burner section 63 to a point near the inner end of the opposite straight member of the burner, and a pilot light is maintained at its free end. This will serve to ensure ignition of the combustible gas issuing from the adjacent straight member of the burner in case the same should be extinguished from any cause, as, for example, by a reduction of pressure in the burner by reason of the adjacent section of the baking chamber becoming so hot as to actuate the thermostatically controlled valve 50, before referred to.

Between the upper section of the conveyor 9 and the upper series of burners is arranged a plate 80, which extends substantially throughout the length of the baking chamber and is connected with the side plates thereof at suitable intervals, so that spaces 81 are provided through which the heat of the burners may pass downwardly and have free access to the articles on the upper run of the conveyor. This plate or shield 80, over the top of the baking chamber, effectively separates the generated vapors from the products under treatment from the flame of the burners, and serves to confine the vapors about and above the material being baked or treated. Furthermore, the shield 80 tends to confine the heat and ensures a uniform temperature throughout the entire area in which the material, such as loaves of bread, is being treated. The conveyors commonly used in ovens of the character to which the present invention relates are so constructed that they provide a practically continuous plate, on which the receptacles for the bread, for example, are supported. This provides a substantially continuous wall extending above the lower series of burners 60 which will transmit heat therefrom to the articles on the conveyor.

As noted above, the plate 80 acts to prevent the vapor, generated by the action of heat on the moist dough, from directly passing into contact with the upper set of burners where it would have a tendency to smother the flame; and also serves to maintain a body of such vapor about the articles on the conveyor.

The vapor produced during the baking operation contains a considerable percentage of alcohol, the action of which on the loaf to a considerable degree determines the color of the crust and imparts a desirable flavor to the body of the loaf. By the construction described loaves of bread, for example, are enveloped in a saturated vapor during the baking operation which results in giving the desired color to the baked loaf. If the shield or baffle 80 is not employed and the pressure of the generated vapor on the loaves reduced by drawing the vapor downward below the marginal side flanges of said plate the currents of air passing over the tops of the loaves will interfere with the formation of the desired crust. The quality of the crust and the color thereof are materially improved by the employment of a means, such as the plate 80, which acts to confine a body of heated vapor about the loaves during the baking operation.

The operation of the several parts of the embodiment of the invention illustrated have been briefly referred to in the foregoing description, and will be clear to those skilled in the art.

It will be seen that by the arrangement described and illustrated any vapor generated during the baking operation is directly withdrawn downward into the duct 25, so that the articles being baked are entirely relieved from any pressure therefrom. The heated vapor and air thus withdrawn from the baking chamber is caused to traverse the casings of the heat exchangers 30, 31, each of said casings being preferably provided with baffles 30ª, which cause said air and vapor to pursue a circuitous course in traveling through the casings, thus imparting a maximum amount of heat to the air or gas passing through the tubes 32. The pumps or blowers 40 maintain a uniform pressure upon the air and gas supplied to the mains which communicate with the several mixers, and as the supply of gas to each group of burners, as well as that to each individual burner of a group can be easily controlled, the temperature of the baking chamber may be maintained at any desired degree.

By practically enclosing the projecting end sections of the conveyor with a body of heat insulating material, undersirable cooling, and consequent loss of heat, by exposure of such end sections is avoided.

To enable the attendants to readily inspect the interior of the baking chamber, suitable inspection windows 90 are provided at various points in the walls of the oven.

It will be seen that the construction of the oven frame is such that any desired number of units or sections may be readily assembled to provide a baking chamber of the required length, and the gearing employed for driving the conveyor is arranged in a very compact manner closely adjacent the sides of the oven, so that a minimum amount of floor space is required.

If, for any reason, the openings in the side walls of the oven must be closed, this may be readily done by means of removable blocks of suitable material.

Each burner may have a relatively short pilot light section 90' extending into it from a header 91 on the outside of the oven, said pilot light section extending, for example, as far as the first opening 61. With such arrangement, any burner may be extinguished without affecting said pilot sections, and quickly ignite from such pilot when the flow of fuel is resumed.

Besides serving to maintain proper combustion at the outlets of each burner to which gas is being supplied, the pilot lights are effective in preventing undesirable cooling of the oven during the intervals of time between baking periods.

Bakers' ovens are ordinarily not operated continuously and during the inactive periods it is desirable to cut off or materially reduce the supply of gas to the burners, to avoid unnecessary consumption of gas and reduce the expense of operation and also to prevent the temperature in the baking chamber from becoming excessive.

By such an arrangement as herein described, the pilot lights may be operative for indefinite periods of time and when at the termination of a baking period the supply of gas to the burners is cut off, by manipulation of the valves 51 or 62, the heat derived from the pilot lights will be sufficient to prevent material reduction of the temperature in the baking chamber. This avoids the delay commonly incident to restoring the desired baking temperature at the beginning of a succeeding baking period before introducing articles to be baked into the oven.

The pilot lights will, of course, operate to relight the burners following a resumption of the flow of gas thereto, after such flow has been interrupted by actuation of the thermostatically controlled valve.

Preferably the fan 37 will be operated continuously, but it is possible that, in some instances, it will only be necessary to relieve the material of pressure during a portion of its travel through the oven chamber, and, of course, the action of the suction fan may be varied or discontinued to suit different conditions.

By preheating the gas and air prior to its delivery to the burners, the volume is increased, and it is possible to make the orifices in the burners larger, and this increase in the size of the orifices eliminates, to a marked degree, the usual difficulties encountered of such oriffices becoming clogged.

While I have shown a specific construction to illustrate my invention, it will, of course, be understood that such variations in structure as are within the range of mechanical skill may be made, and equivalent mechanical expedients adopted for those herein shown without departing from the purview of my invention.

I claim:

1. In a baker's oven, the combination of a chamber, a substantially horizontal support for articles to be baked within the chamber, means for heating the chamber including burners arranged above said support, a stationary horizontal baffle positioned between the article support and the burners above such support, and adapted to maintain a body of vapor generated in the baking operation in contact with the articles being baked while shielding said burners from such vapor, and means for relieving the articles being baked from excessive pressure of said vapor.

2. In a baker's oven, the combination of a chamber, a substantially horizontal support for articles to be baked within the chamber, means for heating the chamber including burners arranged above said support, a stationary baffle arranged between said support and burners and adapted to maintain a body of vapor generated in the baking operation in contact with the articles being baked while shielding said burners from said vapor, and means for relieving the articles being baked from excessive pressure of said vapor by creating a suction downward through the chamber.

3. In a baker's oven, the combination of a being chamber, burners arranged within said chamber, means for supplying fuel to the burners, and means for preliminarily heating the fuel with air and vapor withdrawn from the oven chamber.

4. In a baker's oven, the combination of a baking chamber, means for heating said chamber, an endless conveyor extending through said chamber, and a suction fan mounted on top of the oven and connected with the baking chamber to draw vapor generated from the articles being baked downward through the baking chamber while a body of such vapor of substantially uniform character and pressure is maintained on the articles throughout the length of the chamber.

5. In a baker's oven, the combination of a baking chamber, gaseous fuel burners for heating said chamber, means for relieving the articles being baked of excessive pressure of vapor generated in the baking chamber, and means for causing the vapor withdrawn from the chamber to preliminarily heat all of the gaseous fuel for the burners.

6. In a baker's oven, the combination of a baking chamber, means for heating said chamber, means for supporting within the chamber articles to be baked, means for maintaining above and in contact with the articles being baked a body of vapor generated from said articles by the baking operation, a conduit communicating with the interior of the chamber below the horizontal plane of the said supporting means, and means for withdrawing vapor generated from the articles being baked downward about the articles and through said conduit, whereby all of the articles being baked in the chamber are subjected to a vapor of substantially uniform character and pressure.

7. In a baker's oven, the combination of a baking chamber, means for heating said chamber, a conduit extending longitudinally of and below the bottom of the chamber and communicating with the chamber at a plurality of points, and means for creating suction through the conduit to withdraw heated air and vapor from the chamber.

8. In a baker's oven, the combination of a baking chamber, gaseous fuel burners within said chamber, means for supplying a combustible gaseous mixture under pressure to the burners, means for preliminarily heating the elements of said mixture including a heat exchanger on top of the oven, and means for conducting heated air and vapor from the oven chamber to said heat exchanger.

9. In a baker's oven, the combination of a baking chamber, gaseous fuel burners within said chamber, means for supplying fuel under pressure to the burners, and means for withdrawing heated air and vapor from the chamber and utilizing it to preliminarily heat the gaseous fuel.

10. In a baker's oven, the combination of a baking chamber, a plurality of groups of gaseous fuel burners for heating the baking chamber, mains for air and gas respectively, a mixer associated with each group of burners and connected to both said mains, means for supplying air and gas to said mains, respectively, under pressure, and means for withdrawing heated air and vapor from the oven chamber and using it to heat the air and gas before entering said mains.

11. In a baker's oven the combination of a baking chamber, an endless carrier extending longitudinally through said chamber, burners within the chamber above and below the upper member of the endless carrier, means for supplying fuel to the burners under pressure, and means for preliminarily heating the fuel by air and vapor withdrawn from the oven chamber.

12. In a baker's oven, the combination of a baking chamber having a conduit extending longitudinally of the bottom thereof and provided with a plurality of inlets communicating with the chamber, an outlet being provided in the top of the oven, a transverse conduit connecting the longitudinal conduit with said outlet, a suction fan connected with the outlet, gaseous fuel burners for heating the oven chamber, and means for preliminarily heating the gas supplied to the burners including a heat exchanger arranged in the connection between said outlet and suction fan.

13. In a baker's oven, the combination of a baking chamber, gaseous fuel burners for heating said chamber, two casings each provided with a series of longitudinally extending tubes, one of said casings having an air inlet communicating with the tubes therein at one end, a gas supply pipe communicating with the tubes in the other casing, means for mixing air and gas passing through said tubes and supplying the mixture to the burners, and means for withdrawing heated air and vapor from the oven chamber and supplying it to said casings about the tubes therein.

14. In a baker's oven, the combination of a baking chamber, a conduit extending longitudinally of the bottom of said chamber and communicating therewith, an endless conveyor travelling longitudinally of the baking chamber, burners within the chamber above and below the upper section of the conveyor, a baffle plate between the upper series of burners and the conveyor, and a suction fan arranged outside the oven and connected to said conduit, for the purpose described.

15. In a baker's oven, the combination of a baking chamber, means for supporting a series of articles to be baked within and moving them through the baking chamber, a burner within the baking chamber above the path of the articles to be baked through the chamber, means arranged beneath the burner and above and out of contact with the articles being baked, adapted to maintain a body of vapor, generated from the articles being baked, in contact with the upper surfaces of said articles and to prevent such vapor passing directly into contact with the burner, and means for causing said vapor to pass downward through the baking chamber to relieve the articles being baked from excessive pressure by said vapor.

16. In a baker's oven, the combination of a baking chamber, means for supporting a series of articles to be baked within and moving them through the baking chamber, burners within the baking chamber above and below the path of the articles to be baked, and a baffle arranged between the upper burner and the articles being baked and provided at its sides with flanges that extend downward into the baking chamber adjacent the side walls thereof.

17. In a baker's oven the combination of a baking chamber, means for supporting a series of articles to be baked within and moving them through the baking chamber, burners within the baking chamber above and below the path of the articles to be baked through the chamber, means for preventing vapor generated during the baking operation from passing directly upward into contact with the burner above the articles being baked, and means for causing said vapors to move downward through the baking chamber.

18. In a baker's oven, the combination of a baking chamber, means for supporting a series of articles to be baked within and moving them through the baking chamber, burners within the baking chamber above and below the path of the articles to be baked through the chamber, means for causing vapor generated during the baking operation to move downward through the baking chamber, and means interposed between the upper burner and the path of the articles being baked for maintaining a body of such vapor about the articles being baked and preventing it from passing directly upward into contact with the upper burner.

19. In a baker's oven, the combination with a baking chamber, of a series of U-shape burners arranged within the chamber with the parallel members of each substantially horizontal, and one of said members extending through a side wall of the chamber.

20. In a baker's oven, the combination with a baking chamber, of a series of U-shaped burners arranged within the chamber with the parallel members of each substantially horizontal, and one of said members extending through a side wall of the chamber, the parallel members of each burner comprising two, detachably connected sections.

21. In a baker's oven, the combination with a baking chamber, of a series of U-shape burners arranged within the chamber with the parallel members of each substantially horizontal, and one of said members extending through a side wall of the chamber, and a small tube extending from the member that passes through the oven wall, adjacent said wall, to a point adjacent the other member and the bowed section between said members.

22. In a baker's oven, the combination with a baking chamber, of a series of burners within the baking chamber each consisting of a U-shape tube closed at one end and provided with lateral perforations along the outer faces of its substantially parallel members, the unclosed one of which extends through a side wall of the chamber.

23. In a baker's oven, the combination with a baking chamber, of a series of horizontal burners extending laterally into the chamber from a side wall, each burner comprising two sectional, parallel laterally perforated members, one of which extends through the chamber wall and the other of which is closed at one end, and an intermediate curved section, and means outside the chamber for supplying fuel to each of the burners.

24. In a baker's oven, the combination of a substantially horizontal, elongated, baking chamber, means for moving articles to be baked longitudinally through the baking chamber, a plurality of burners extending transversely of the baking chamber and arranged in groups which are spaced apart longitudinally of the chamber to provide a plurality of heating zones, and a thermostatically actuated valve controlling each group of burners.

25. In a baker's oven, the combination of a substantially horizontal, elongated, baking chamber, means for moving articles to be baked longitudinally through the baking chamber, a plurality of burners extending transversely of the baking chamber and spaced apart longitudinally of the chamber to provide a plurality of heating zones, manually actuated means controlling each burner, and supplemental burner control means adapted to be automatically actuated by variations in the temperature of the zone of the baking chamber in which each burner is arranged.

26. In a baker's oven, the combination of a baking chamber, means for moving articles to be baked through the baking chamber, a plurality of burners for heating the baking chamber, a pilot light adjacent each burner, and manually operable valves controlling the supply of fuel to the several burners without affecting the supply of fuel to the pilot lights.

27. In a baker's oven, the combination of a substantially horizontal, elongated, baking chamber, means for moving articles to be baked longitudinally through the baking chamber, a plurality of burners extending transversely of the baking chamber and spaced apart longitudinally of the chamber to provide a plurality of heating zones, a pilot light adjacent each burner, a thermostatically actuated valve controlling supply of fuel to all of the burners of each heating zone, and an independent manually operable valve controlling the supply of fuel to each individual burner, the pilot lights being supplied with fuel independent of said valves.

In testimony whereof I have hereunto set my hand.

CORRY B. COMSTOCK.